United States Patent
Cheng et al.

(10) Patent No.: US 6,772,301 B2
(45) Date of Patent: Aug. 3, 2004

(54) FAST AGING SCHEME FOR SEARCH ENGINE DATABASES USING A LINEAR FEEDBACK SHIFT REGISTER

(75) Inventors: Paul Cheng, San Jose, CA (US); Nelson L. Chow, Mountain View, CA (US)

(73) Assignee: Integrated Silicon Solution, Inc., Santa Clara, CA (US)

( * ) Notice: Subject to any disclaimer, the term of this patent is extended or adjusted under 35 U.S.C. 154(b) by 272 days.

(21) Appl. No.: 10/177,895

(22) Filed: Jun. 20, 2002

(65) Prior Publication Data

US 2003/0236955 A1 Dec. 25, 2003

(51) Int. Cl.[7] .............................................. G06F 12/00
(52) U.S. Cl. ...................... 711/159; 711/108; 711/133
(58) Field of Search ..................... 365/49, 50; 370/374, 370/392, 395.7, 409; 711/108, 133, 156, 159; 707/3; 709/238

(56) References Cited

U.S. PATENT DOCUMENTS 5,875,465 A * 2/1999 Kilpatrick et al. .......... 711/134
6,400,715 B1 * 6/2002 Beaudoin et al. ........... 370/392
2002/0188808 A1 * 12/2002 Rowlands et al. .......... 711/133

OTHER PUBLICATIONS

The Electrical Engineering Handbook, 1993, pp. 1727, 1734, 1813–1816, 1830–1832, CRC Press, Inc., Boca Raton, Florida, USA.
Bleachy/Blair, Excerpted from Abstract Algebra, 2nd ed., 1996, Abstract Algebra On Line: Galois Theory, at http://www.math.niu.edu/~beachy/aaol/galois.html on Apr. 11, 2001.

* cited by examiner

*Primary Examiner*—Nasser Moazzami
*Assistant Examiner*—Christian P. Chace
(74) *Attorney, Agent, or Firm*—Raymond F. Roberts Intellectual Property Law Offices

(57) ABSTRACT

A fast aging system (10) which may work with a memory (12) in which data words (16) having aging words (18) are stored. An aging address counter (20) selects an aging word (18) for updating based on a state change in a linear feedback shift register (LFSR) (24). Optionally, in the aging word (18) a zero value (52) may represent a permanent data words (16), a predefined non-zero value (56) may represent data words (16) which are available for replacement, and other zero values may represent data words (16) which are in various stages of valid lifetimes and which should not be replaced yet.

22 Claims, 3 Drawing Sheets

```
1 2 3
1 0 0
1 1 0
1 1 1
0 1 1
1 0 1
0 1 0
0 0 1
―――――
1 0 0    Starts repeating
```

FAST AGING SCHEME FOR SEARCH ENGINE DATABASES USING A LINEAR FEEDBACK SHIFT REGISTER

TECHNICAL FIELD

The present invention relates generally to static information storage and retrieval systems, and more particularly hardware based database storage systems including those commonly employing associative memories, which are also referred to as content memories or tag memories.

BACKGROUND ART

Many real world applications today require searching information at high speed. In particular, as network-systems proliferate in which data packets are transferred based on the contents of address information contained there in, it is increasingly desirable to perform very high speed comparisons to deliver such data packets ("switching" and "routing" are the terms particularly used in the networking and data communication field). This has motivated the industry to turn to hardware solutions, including a class of circuits known as "content addressable memories" (CAM). The following discussion will generally use network routing as an example, although many other applications also exist where high speed searching is desirable, and where the hereby described invention may be useful.

A CAM compares an input string, bit by bit, with a plurality of data words stored in databases in the CAM. If the bits of one of the data words match those of the input data string, the CAM will provide as an output the match address of that data word. This process is typically called table lookup and the data words in the lookup table are called table entries. It should be noted in passing that there may be a number of variations in CAM and in this table lookup process. For instance, matching of a complete string can be undertaken, or only partial matching. A common example of the latter is finding a "longest prefix match." If multiple matching data words are found, a prioritization scheme is used to output the address of just one match. Detailed coverage of these and other variations will not be provided here, but those skilled in the art will appreciate that this discussion can have wider relevance.

In a typical CAM application, such as network routing, the entries in a routing table desirably have different lifetimes. While some entries need to be "valid" all of the time, and hence remain in the lookup table permanently, other entries need to remain in the lookup table only temporarily.

Furthermore, all of the temporary entries in a lookup table do not have the same frequency of access. A temporary entry that has not been accessed for a long time should eventually be deleted and replaced by a new entry.

To achieve this, each entry is provided with a predetermined "time to live" and a timer starts after its last access. If an entry is not accessed within its lifetime, it is regarded as invalid or expired and its address in the lookup table is made available for storing a new entry. If an entry is accessed within its lifetime, the associated timer is reset and it begins a "new life." This aging process makes the lookup database size more manageable and keeps its content current and fresh.

In conventional practice, extra bits are tagged along with each data word when it is made a table entry. These "aging bits" are used to keep track of a respective table entry's time to live. The aging bits are first initialized to the lifetime of the corresponding table entry, and then decremented periodically by an aging clock having a period predetermined by the user of the CAM.

Updating the aging bits is preferably an atomic operation, i.e., no other operation on the bits should be allowed before completion of the update process. This is desirable because the lookup table is being constantly updated by an external host processor, and that dictates that the aging process be carried out in the shortest time possible to prevent potential interference with the external host. Prior-art implementations solve this problem by denying lookup table access to the host processor while the internal aging process is in progress. This latter case is clearly undesirable.

An aging scheme should also handle other concerns well, besides merely being fast. Recall that some entries need to remain in the lookup table permanently. An aging scheme should therefore also accommodate this need.

An aging scheme should also use the lookup table size efficiently in order to minimize circuit size, power consumption, material usage, complexity, cost, etc. The lookup table can be viewed as an array, having a width defined by the number of the data word bits and the aging bits, and a depth defined by the number of possible data words. For instance, a 128×1K CAM unit may store 1024 table entries, each consisting of a 120-bit data word and 8 aging bits. Or it might store the same number of table entries, with each entry consisting of a 125-bit data word and 3 aging bits. This is all well and good if only 3 aging bits are enough. However, if the application requires at least 80 aging increments, 3 aging bits will not be sufficient. Instead, 7 aging bits will be required and a 132×1K CAM unit may have to be used instead ($2^3=8<80$; $2^7=128>80$). Therefore it would be beneficial to have an aging scheme that can provide a large number of aging increments without requiring a correspondingly large portion of the lookup table size just for that.

Accordingly, what is needed is a fast aging scheme for search engine databases. Such a scheme should preferably be atomic, use a minimal number of aging bits, and be able to well handle the three conditions wherein database entries are permanent, currently valid but not permanent, and invalid or replaceable. Furthermore the scheme should facilitate efficient database table size usage.

DISCLOSURE OF INVENTION

Accordingly, it is an object of the present invention to provide fast aging scheme for search engine databases, preferably one fast to the point of performing aging as an atomic operation.

Another object of the invention is to provide an aging scheme for search engine databases which efficiently handles permanent, valid, and invalid data entries.

And another object of the invention is to provide an aging scheme for search engine databases which efficiently uses the database table size.

Briefly, one preferred embodiment of the present invention is a system for aging data entries in a search engine database. A clock is provided for producing a clock signal. A memory is provided for containing multiple data entries to be aged, wherein each said data entry has a respective aging word. An aging address counter is provided for selecting a current data entry from among the data entries, based on the clock signal, thereby also implicitly selecting a current aging word. A linear feedback shift register (LFSR) is provided for receiving an input signal based on the current aging word and producing an output signal based on a state change responsive to that input signal. Finally, a control unit is provided for selectively updating the current aging word based on the output signal from the LFSR.

An advantage of the present invention is that it produces a flexible, atomically fast-aging scheme for search engine databases which inherently handles the three possible data entry conditions.

Another advantage of the invention is that it facilitates efficient database table size usage, in an optional yet highly user configurable manner.

Another advantage of the invention is that it is scalable to accommodate larger number of aging bits without suffering performance penalty.

Another advantage of the invention is that it works well with memory types which are used for search engine databases, including content addressable memory (CAM).

And another advantage of the invention is that it integrates well with prior art methodologies, particular working efficiently with circuitry employing the inventive fast aging scheme.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
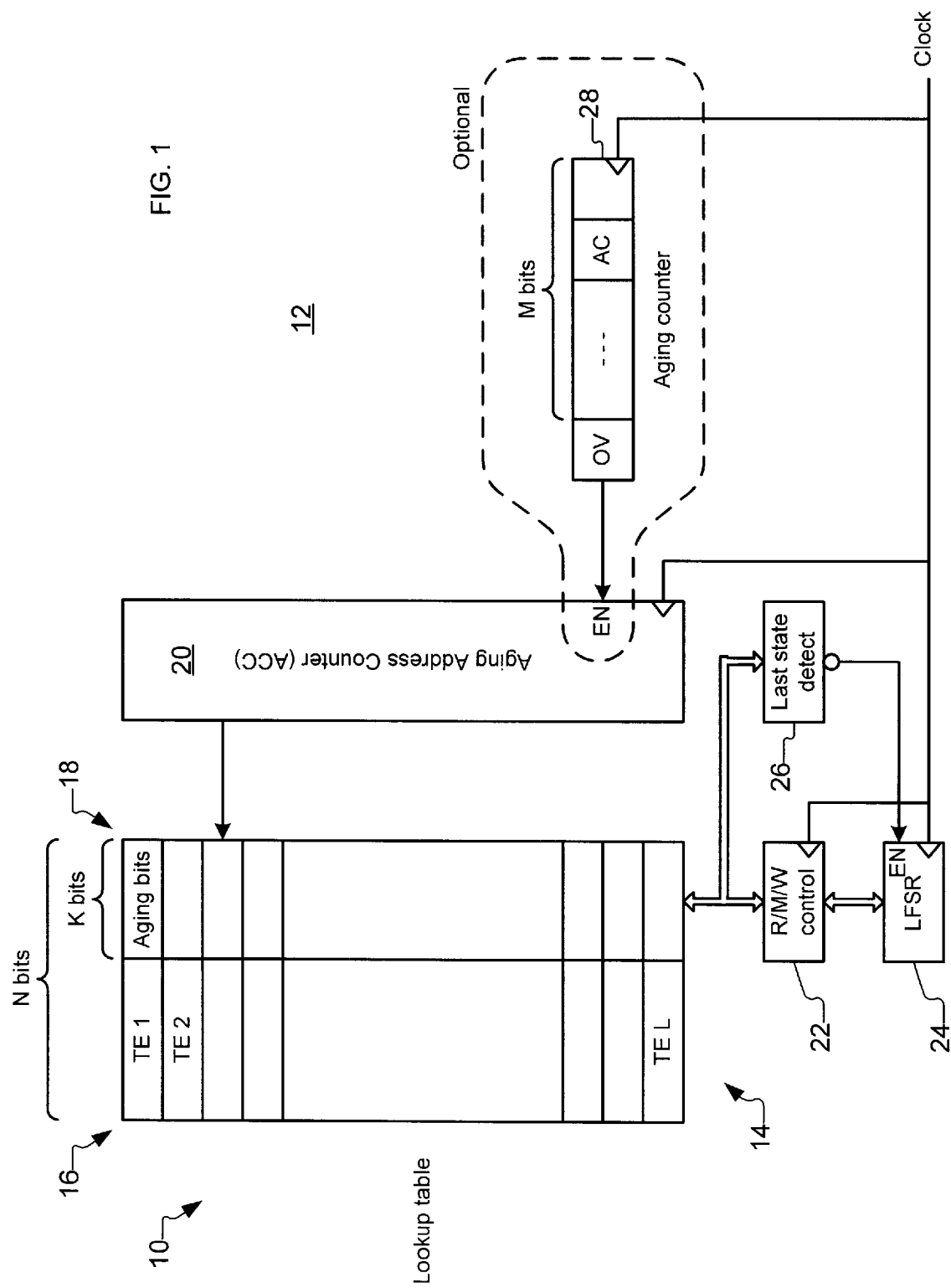
FIG. 1 is a block diagram illustrating a preferred architecture for implementing the inventive fast aging system within a content addressable memory.

A preferred embodiment of the present invention is a fast aging system for search engine databases. As illustrated in the various drawings herein, and particularly in the view of FIG. 1, this preferred embodiment of the invention is depicted by the general reference character 10.

FIG. 1 is a block diagram illustrating a preferred architecture for implementing the inventive fast aging system 10 within a content addressable memory (CAM 12). As shown, the CAM 12 includes a lookup table 14 suitable for containing data words 16 each consisting of a number of data bits, of which a sub-set of these data bits (typically the "last" bits in the data word 16) form an aging word 18. As shown, the lookup table 14 may be defined as containing L total data words 16, each having N total data bits, wherein each data word 16 includes an aging word 18 having K data bits.

The aging words 18 can be accessed sequentially by an aging address counter 20. The age updating operation may typically start by pointing the aging address counter 20 to the first data word 16, and its aging word 18 entry, and proceeding row by row, one per clock cycle, through each entry in the lookup table 14. When the aging address counter 20 selects to a particular entry (row), an R/M/W control 22 performs a read, modify, and write operation on the corresponding aging word 18, thereby updating the age of the respective associated data word 16.

Since updating the aging word 18 is desirably an atomic operation, the R/M/W control 22 needs to accomplish its task within one clock cycle. To accomplish this a linear feedback shift register (LFSR generally, and LFSR 24 in the figures herein) is used to update the aging word 18. One useful characteristic of the LFSR is that maximal-length variants of length or "degree" K, when started with a non-zero initial value, will cycle through all of $2^K-1$ non-zero values before repeating (non-maximal-length variants are discussed presently). A LFSR does not increment or decrement in the ordinary arithmetic sense, but visits a series of unique non-zero value before repeating. A maximal-length LFSR visits every possible non-zero value before repeating. The principal at work here is illustrated with simplified examples in FIG. 2 and FIG. 3.

Figure 2:
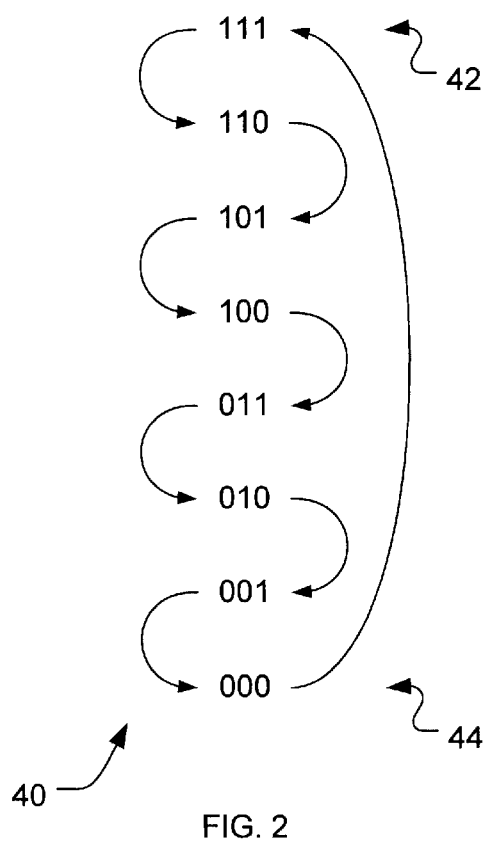
FIG. 2 is a flow diagram showing a conventional arithmetic count ordering for cycling through possible values of a 3-bit word.

FIG. 2 is a flow diagram showing a conventional arithmetic counting order 40 for cycling through all possible values of a 3-bit word. The word may start with a maximum value 42 (111), decrement through sequential values until a minimal value 44 (000) is reached, and then repeat this sequence. Of course, incrementing in a similar manner is also possible. Such incremental and decremental counting approaches are commonly used in the electronic arts. In this manner a 3-bit word permits a count through $2^3$ states or a total of 8 unique values.

Figure 3:
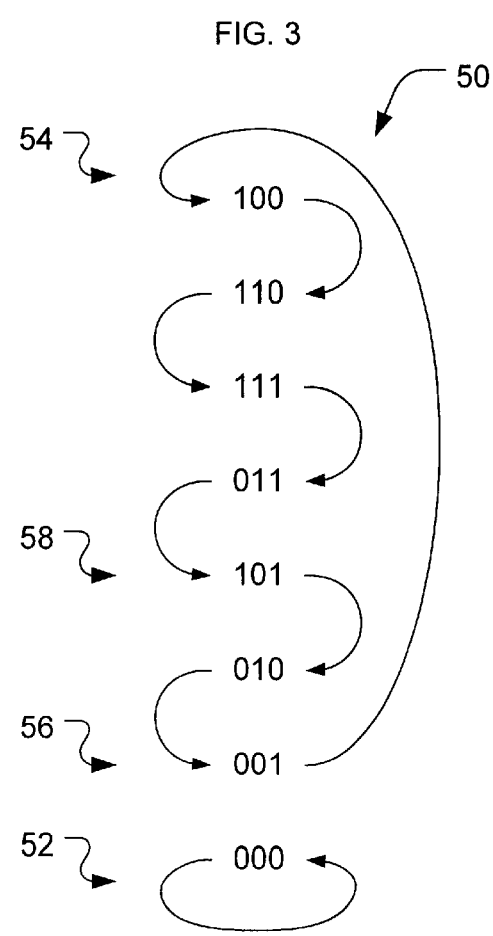
FIG. 3 is a flow diagram showing a Galois field ordering for cycling through possible values of a 3-bit word.

FIG. 3 is a flow diagram showing a non-arithmetic counting order 50 (specifically a Galois field based ordering) used when cycling through possible values of a 3-bit word. The order here is the state sequence produced by the maximal-length LFSR 24 of degree 3 (K=3) shown in FIG. 4. The same total of 8 unique values are present, but they are cycled through in a non-conventional manner. Rather, starting with a zero value 52 (000) the next value is always zero, i.e., the same zero value 52 (000); and starting with any non-zero initial value 54 (here 100) another non-zero last value 56 (here 001) is arrived at. All possible $2^3-1$, or 7 possible non-zero values are ultimately arrived at in this manner, and then and only then is the initial value 54 (100) arrived at again and the sequence able to repeat. This complete state sequence produced by an LFSR is often termed a "maximal length sequence" and its repeatable randomness is often termed a "pseudorandom binary sequence."

Figure 4:
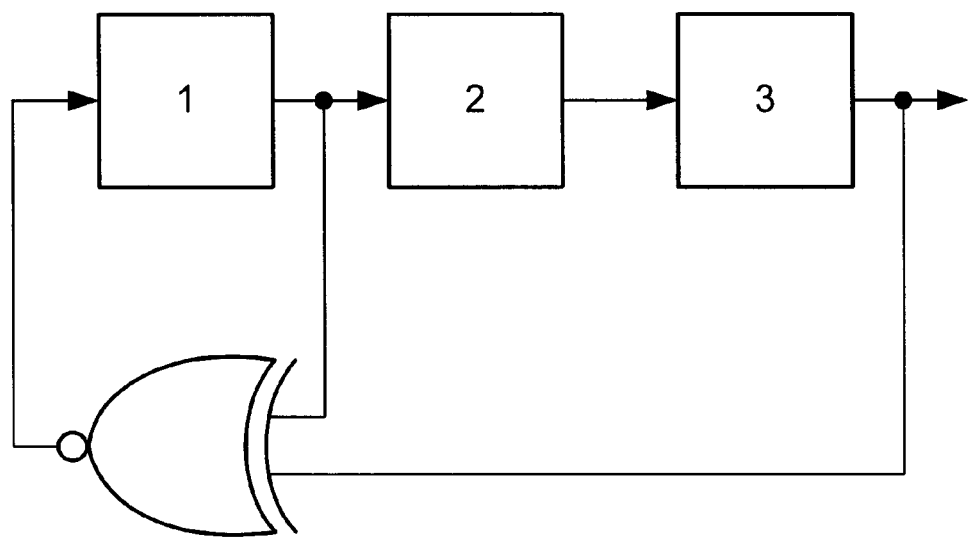
FIG. 4 is a block diagram of a maximal-length linear feedback shift register (LFSR) of degree three, suitable for producing the state sequence or ordering shown in FIG. 3.

With reference again to FIG. 1, the R/M/W control 22 reads the current value of the aging word 18, uses it to set the current state of the LFSR 24, reads out the next state of the LFSR 24, and writes that back as the new value of the aging word 18. The logic of the LFSR 24 may be simple, as the circuit of the 3-bit maximal-length LFSR 24 shown in FIG. 4 illustrates, and this ensures that the R/M/W control 22 can complete its task in one clock cycle, i.e., that its operation is atomic.

As long as all new data words 16 entered into the lookup table 14 have the same non-zero value in their respective aging words 18, say, the seed or initial value 54 (100) in FIG. 3, we know that it will take $(2^3-1)-1$, or 6 update cycles by the aging address counter 20 for the aging words 18 to reach the last value 56 (001).

The use of the LFSR 24 provides two other particular benefits. Firstly, as noted in passing above, when given an initial zero value a LFSR will stay in the zero state (see e.g., FIG. 4). This is useful to ensure that a static or permanent table entry stay in the lookup table 14. The aging word 18 of such a table entry can simply be set to the zero value 52 (000) and no special further handling is required. When the LFSR 24 encounters an aging word 18 with the zero value 52 the zero value 52 is the next state and is what is stored in the aging word 18. Unlike prior art systems, no special logic is required and no extra "static bit" is required in each aging word 18 to accomplish this.

Secondly, a simple detection logic can be implemented to detect a non-zero last value before the LFSR sequence repeats. In FIG. 1 the detection logic is provided in the last state detector 26. Since any arbitrary non-zero initial value can be chosen, the last value can easily be computed (note, in the maximal-length LFSR example in FIG. 3 any sequential pair of non-zero values may be chosen to serve as the initial and last values, 100 and 001 were arbitrarily chosen). The last state detector 26 simply detects the last value 56. Upon detection of the last value, the last state detector 26 can then inhibit a further state change in the LFSR 24, i.e., rolling over from the last value 56 back to the initial value 54. The last value 56 therefore remains in the aging word 18 and can usefully serve as an indication of the invalid or expired condition of the data word 16. Alternately, as is discussed further presently, the last value 56 may be used to set a corresponding invalid bit associated with the aging word 18, in a similar manner to that of much of the prior art. Of course, when a new data word 16 is stored in the lookup table 14 a "fresh" aging word 18 concurrently gets stored, typically one containing the initial value 54 (although, in particularly sophisticated embodiments shortened life times can be provided for by using a new aging word 18 containing a non-zero value other than the initial value 54).

A number of other variations and options on the inventive fast aging system 10 have been contemplated by the inventors. FIG. 1 shows one variation, a preferred embodiment of the inventive fast aging system 10 which permits a shortened length for the aging words 18. The aging address counter 20 may be enabled by an optional aging counter 28. When present, the aging counter 28 may have its M-bit length determined by the user. When the aging counter 28 overflows it enables the aging address counter 20 and this starts the age update operation. In this manner, when K=3 and M=4 a total of 7-bits of aging control is provided and the total life of a temporary data word is $2^7-1=127$ rather than $2^3-1=7$ clock cycles. However, the aging word 18 is still only 3 bits long, taking up only 3 bits per entry, and the LFSR 24 need only be of degree three. Accordingly, the optional aging counter 28 expands the lifetime of data entries without adding more bits to the aging word.

Other variations of the fast aging system 10 are realizable with different numbers and types of memory. For instance, the lookup table 14 may consist of one contiguous unit of memory, as implied by FIG. 1, or it may include separate, different memory units. The data words 16 and the aging words 18 might then be stored in different memory units. Furthermore, these memory units may even be entirely different types of memory. For instance, the CAM 12 in FIG. 1 might be replaced with another type of memory, or the data words 16 might be stored in a CAM and the aging words 18 stored in another type of memory.

The R/M/W control 22 and the last state detector 26 in the fast aging system 10 can also be implemented in different ways. In FIG. 1 they are depicted as operating in parallel, where the aging word is simultaneously latched in the R/M/W control 22 and the last state detector 26. Upon detection of the last value, the last state detector 26 will disable the LFSR 24, the R/M/W control 22, or both to prevent the R/M/W control 22 from updating the aging word 18. In another variation, the last state detection logic can be an integrated part of the R/M/W control 22 that, upon detection of the last state, disables the LFSR 24.

Yet other possible variations of the fast aging system 10 may be in the LFSR 24, or with respect to how the pseudorandom binary sequence is generated and used. The example in FIGS. 3–4 herein uses K=3 to facilitate concise illustration, but this is not a requirement and there is no limit to the length of LFSR used. Many higher order LFSRs are known (see, e.g., The Electrical Engineering Handbook, CRC Press, 1993, discusses LFSRs with K=3, 4, 10, and 30), and such have been used as scramblers in telecommunications. LFSRs which are not of maximal-length may also be used. Such will not produce all possible non-zero states, but a usable shorter pseudorandom sequence of non-zero states.

The inventive fast aging system 10 may also be used with existing aging methodologies. In fact, one of the inventors' preferred embodiments does exactly this by using an added valid bit. A 4-bit aging word 18 is used wherein three bits are used as described above, and the fourth bit is used to indicate validity. If the R/M/W control 22 encounters the last value 56, it sets the valid bit. If the valid bit is set, the last state detector 26 disables the LFSR 24. Signaling data word validity with a dedicated bit has a pragmatic utility in some applications. For instance, this greatly simplifies the circuitry (not shown) which is used to create and work with the data words 16.

The foregoing description of the inventive fast aging system 10 shows that it is a simple but highly effective solution for high performance aging. Prior art systems have required elaborate logic, extra registers, counters and several additional bits to provide aging and still meet the critical-speed requirement. In contrast, the fast aging system 10 is atomic in operation and its use of particular values in the aging word 18 reduces design complexity, power consumption, and die and board real estate.

The fast aging system 10 leverages certain characteristics of the LFSR. The pseudorandom binary sequence of a LFSR may initially seem strange, and the underlying Galois theory is perhaps daunting to many, but the repeatable randomness which this provides works very well. Among other things, what the inventors have appreciated and applied here is that the number of unique states is what is important, rather than any specific overall ordering of the values in those states. This approach employing a LFSR produces up to $2^K$ usable states, albeit $2^K$ different ones than the arithmetic count approach used by the prior art.

While various embodiments have been described above, it should be understood that they have been presented for the purpose of illustration, they are not intended to be exhaustive or to limit the invention to the precise form disclosed by way of example only, and not limitation. Thus, the breadth and scope of the invention should not be limited by any of the above described exemplary embodiments, but should be defined only in accordance with the following claims and their equivalents.

INDUSTRIAL APPLICABILITY

The presented fast aging system 10 is well suited for application in search engine databases, as fast aging update is important in many lookup database systems and especially critical in high performance CAM-based systems. For example, as networking-systems proliferate, efficient management of large databases of dynamic network addresses is urgently needed in high speed data packet switching and routing applications. The present invention provides a particular fast "atomic" aging scheme for use in search engine databases.

Concurrently, the fast aging system 10 efficiently may identify and handle at least two, and optionally three or more types data entries. By virtue of the specific features of a LFSR to always map a zero-value to the same zero value, tagging data entries with a zero value provides a way to identify one class of the data entries, and tagging data entries with a non-zero value provides another way to identify one or more additional classes of the data entries. For example, all other non-zero values may be used to represent just one additional such class. Or, as described in an example herein, one particular non-zero value may represent a class (all invalid or expired entries) and all other non-zero entries may represent yet another class (valid but non-permanent entries). Of course, multiple non-zero values may be particularly assigned to respective classes, individually or as sets, and more than three classes of data entries handled based on this. The K-bit maximal length LFSR provides $2^K$ unique states, with up to $2^K-1$ of these being non-zero states.

The fast aging system 10 may, optionally, also efficiently minimize database table size by using an aging counter 28 to eliminate the need to store low order aging bits in the table itself. As database tables typically store thousands of entries, the aging counter may provide a substantial savings of memory space in the table for other use. In some situations, this can permit avoiding the use of a higher capacity component.

The fast aging system 10 may also work with different memory types. For instance, continuing with the network routing example, the invention may particularly use content addressable memory (CAM). The invention is not directly tied to any memory type or manufacturing process, and this makes it potentially applicable across all memory types or manufacturing processes.

The fast aging system 10 also integrates well with prior art methodologies. In general, search engine databases employing it may be used as a replacement for existing search engine databases. Embodiments of the invention can be configured to work in larger systems wherein an entire aging word is processed by the larger system, or wherein a valid bit is set by the fast aging system 10 and used as a flag by the larger system.

For the above, and other, reasons, it is expected that the fast aging system 10 of the present invention will have widespread industrial applicability. Therefore, it is expected that the commercial utility of the present invention will be extensive and long lasting.

What is claimed is:

1. A system for aging data entries in a search engine database, the system comprising:
   a clock for producing a clock signal;
   a memory for containing a plurality of the data entries to be aged, wherein each said data entry is associated with a respective aging word;
   an aging address counter for selecting a current data entry from among said plurality of data entries, responsive to said clock signal, thereby also implicitly selecting a current aging word;
   a linear feedback shift register (LFSR) for receiving an input signal based on said current aging word and producing an output signal based on a state change responsive to said input signal; and
   a control unit for selectively updating said current aging word based on said output signal.

2. The system of claim 1, wherein said control unit selectively updates said current aging word to contain:
   a non-zero value other than a predetermined value, to thereby reflect that said current data entry is valid; or
   said predetermined value, to thereby reflect that said current data entry is invalid and available for replacement with a new data entry.

3. The system of claim 1, wherein instances of said current aging word may contain a zero value, to thereby reflect that said current data entry is permanently valid.

4. The system of claim 1, wherein said data entries are associated with their respective said aging words by having said aging words stored therein as integral parts thereof.

5. The system of claim 1, wherein each said aging word includes a valid bit for indicating validity of said aging word.

6. The system of claim 1, wherein said memory includes a first memory unit for containing said data entries and a second memory unit for containing said aging words.

7. The system of claim 6, wherein at least one of said first memory and said second memory include a content addressable memory (CAM).

8. The system of claim 1, wherein said LFSR is a maximal-length LFSR.

9. The system of claim 1, wherein said control unit includes a read-modify-write control for reading said current aging word from said memory and providing it to said LFSR as said input signal, and for receiving said output signal from said LFSR and writing it into said memory as an update instance of said current aging word.

10. The system of claim 9, wherein said control unit includes a state detector for detecting a predetermined value in said current aging word and selectively disabling said read-modify-write control from changing said current aging word.

11. The system of claim 1, wherein:
    said aging address counter is further for accessing said current aging word responsive to an aging enable signal; and
    the system further comprising:
    an aging counter for generating said aging enable signal responsive to having counted a predetermined number of cycles of the clock.

12. A method for aging data entries in a search engine database, comprising the steps of:
    (a) storing a plurality of the data entries to be aged in a memory, wherein each said data entry is associated with a respective aging word;
    (b) selecting a current data entry from among said plurality of data entries, responsive to a clock signal, thereby also implicitly selecting a current aging word;
    (c) producing a state change in a linear feedback shift register (LFSR) responsive to said input signal; and
    (d) updating said current aging word based on said state change.

13. The method of claim 12, wherein said step (a) includes associating the data entries with their respective said aging words by having said aging words stored therein as integral parts thereof.

14. The method of claim 12, wherein each said aging word includes a valid bit and said step (a) includes indicating validity of said aging word based on said valid bit.

15. The method of claim 12, wherein said step (a) includes storing said data entries in a first memory unit and storing said aging words in a second memory unit.

16. The method of claim 15, wherein at least one of said first memory and said second memory include a content addressable memory (CAM).

17. The method of claim 12, wherein said step (b) includes accessing said current aging word responsive to an aging enable signal; and the method further comprising:

(e) generating said aging enable signal responsive to having counted a predetermined number of cycles of said clock.

18. The method of claim 12, wherein said step (d) includes selectively updating said current aging word based on said state change to contain:

a non-zero value other than a predetermined value, thereby reflecting that said current data entry is valid; or said predetermined value, thereby reflecting that said current data entry is invalid and available for replacement with a new data entry.

19. The method of claim 18, wherein said step (d) further includes:

selectively disabling changing said current aging word, thereby continually reflecting that said current data entry is invalid.

20. The method of claim 12, wherein said step (d) includes updating said current aging word based on said state change to contain a zero value, thereby reflecting that said current data entry is permanently valid.

21. The method of claim 12, wherein said step (d) includes:

providing said current aging word from said memory to said LFSR as said input signal;

receiving an output signal from said LFSR based on said state change; and writing an update instance of said current aging word back into said memory based on said output signal.

22. The method of claim 12, wherein said LFSR is a maximal-length LFSR.

* * * * *